United States Patent [19]
Johnson

[11] Patent Number: 6,097,670
[45] Date of Patent: Aug. 1, 2000

[54] METHOD AND APPARATUS FOR TRACKING OBJECTS UNDERWATER

[75] Inventor: Robert L. Johnson, Pasco, Wash.

[73] Assignee: Battelle Memorial Institute, Richland, Wash.

[21] Appl. No.: 09/087,226

[22] Filed: May 27, 1998

[51] Int. Cl.$^7$ ........................................... G01S 3/80
[52] U.S. Cl. ........................ 367/120; 367/119; 367/118
[58] Field of Search ..................... 367/118, 120, 367/137, 138, 119, 131

[56] References Cited

U.S. PATENT DOCUMENTS

| | | | |
|---|---|---|---|
| 4,914,642 | 4/1990 | Fraser et al. | 367/122 |
| 5,095,467 | 3/1992 | Olson et al. | 367/125 |
| 5,168,473 | 12/1992 | Parra | 367/124 |
| 5,331,602 | 7/1994 | McLaren | 367/6 |

OTHER PUBLICATIONS

"Ultrasonic Tracer" Electronics, vol. 30, No. 4, pp. 156–160, Apr. 1, 1957.

Steig et al, "Monitoring fish movement patterns in a reservoir using horizontally scanning split beam techniques", ICES Journal of Marine Science, vol. 53, pp. 435–441, 1996.

Racca et al., "Technological advances in riverine fish counting for coastal fishery management", 1996.

Primary Examiner—Ian J. Lobo
Attorney, Agent, or Firm—Frank S. Rosenberg

[57] ABSTRACT

The position of an object is tracked underwater. Prior to tracking, the object is tagged with an acoustic transmitter. It is important that the transmitter emits sound waves having a frequency of at least 200 kilohertz (kHz) because it has been found that these transmitter frequencies provide better tracking data in noisy environments than conventional transmitters operating at 50–60 kHz. The acoustic transmitter is located by a split-beam transmitter. The position of the object can be accurately tracked by using two split-beam transducers, synchronization of transducer and transmitter, or echo ranging.

21 Claims, 7 Drawing Sheets

METHOD AND APPARATUS FOR TRACKING OBJECTS UNDERWATER

This invention was made with Government support under Contract DACW 68-96-D-0002 awarded by the U.S. Army Corps of Engineers. The Government has certain rights in the invention.

FIELD OF THE INVENTION

The present invention relates generally to a method for tracking the position of objects underwater. More specifically, the invention relates to hydroacoustic tracking of objects (such as fish) that have been tagged with a pinger.

BACKGROUND OF THE INVENTION

The U.S. Army Corps of Engineers and others involved in hydropower generation are actively developing techniques to move juvenile salmon past their facilities without entraining them through turbines (see, e.g., Northwest Power Planning Council, Columbia River Basin Fish and Wildlife Program, Portland, Oreg., 1994; National Marine Fisheries Service, "Biological opinion: reinitiation of consultation on 1994–1998 operation of the federal Columbia River power system and juvenile transportation program in 1995 and future years." 1995). Constructing fish bypasses around hydroelectric projects can cost millions of dollars, and yet the bypasses may not work as well as their designers had hoped. To develop methods for improving the survival of fish near hydroelectric projects, it is important to evaluate the behavior of the fish as they approach and pass through a hydroelectric project. In studying the behavior of fish near hydroelectric projects, it is desirable to be able to track the position of individual fish on a fine scale, and in noisy environments, and to distinguish one species of fish from another.

Conventional methods of tracking underwater objects are useful in many instances but suffer from various limitations. For example, conventional fixed location hydroacoustics is typically unable to track individual fish, weak in species discrimination, and can be ineffective in noisy environments. On the other hand, conventional radio telemetry provides species-specific tracking capabilities, but is generally inadequate when location accuracy is required, especially in deep water such as in the forebay or reservoir of a hydroelectric power system. Thus, despite prior efforts, there remains a need for a method that provides accurate positional tracking of underwater objects, especially particular fish species, in noisy environments such as the forebay of hydroelectric projects.

SUMMARY OF THE INVENTION

The present invention provides a method and apparatus for the three dimensional tracking of an object underwater. An acoustic transmitter is attached to the object to be tracked. It has been discovered that a transmitter frequency of at least about 200 kilohertz (kHz) provides good tracking ability in noisy environments. Relative to prior attempts which used a transmitter frequency of 50–60 kHz, a transmitter frequency of at least 200 kHz provided tracking data with significantly higher signal to noise ratio. In a first aspect, the transmitted frequency is monitored by at least two underwater, split beam transducers that are located a known distance apart. The transducers lock onto the transmitted signal and the information from the transducers is sent to a processor which calculates the location of the object.

In a second aspect, the invention provides a method and apparatus for the three dimensional tracking of an object underwater in which a transmitter having a frequency of at least about 200 kHz is attached to the object. The transmitted frequency is monitored by an underwater, split-beam transducer that accurately identifies the direction of the object. The transmitter and transducer are synchronized, thus allowing the distance from the transducer to be accurately measured. Alternatively, the position of the split-beam transmitter can be measured by the transducer operating in an active-passive mode in which the transducer passively locates and accurately determines the direction of the transmitter and measures the distance to the transmitter in the active mode by synchronized echo ranging at the same or different frequency.

The inventive methods provide numerous advantages including the ability to accurately track objects in three dimensions underwater. The methods are effective in turbid water and in the presence of background noise. The invention is particularly advantageous for tracking the movement of fish near hydroelectric projects including the downstream movement of juvenile salmon, adult fallback and predator-prey interactions.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENTS

Figure 1:
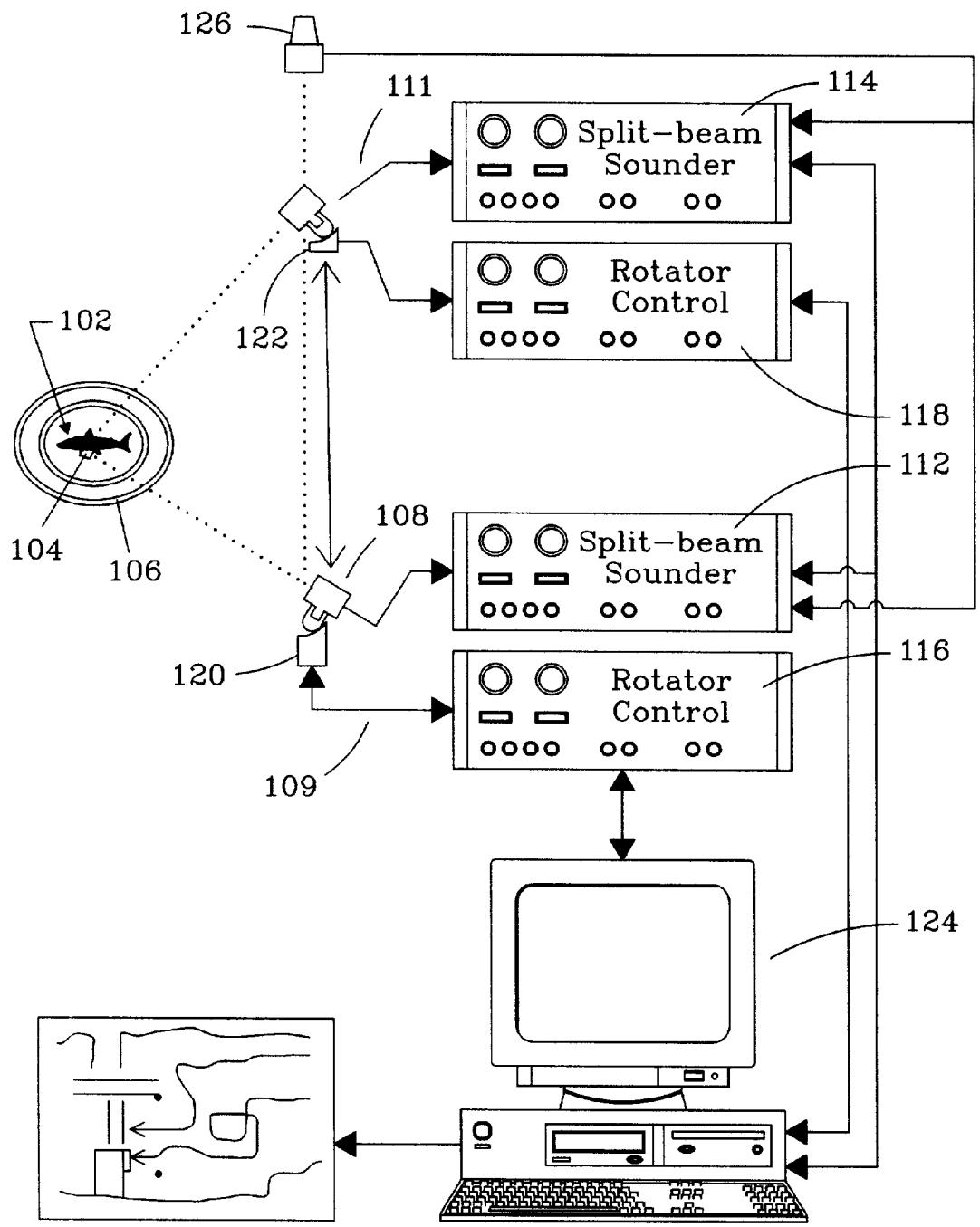
FIG. 1 is a schematic illustration of a two split-beam transducer tracking system.
Figure 2:
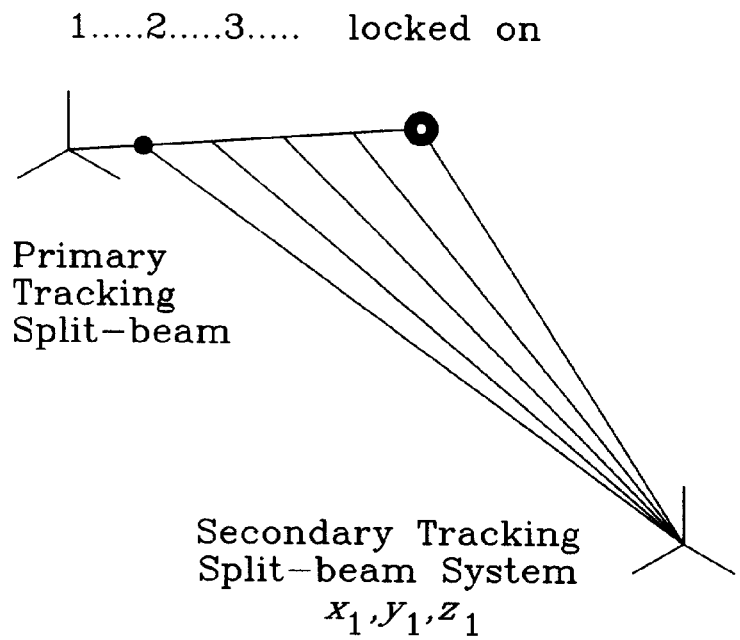
FIG. 2 is a schematic representation of a lock-on sequence of the secondary tracking split-beam system.

A preferred embodiment of apparatus in a first aspect of the invention is illustrated in FIG. 1. An object (typically a fish 102) is tagged with a transmitter 104 that emits a pulse of sound waves 106 at a selected frequency. The signal is received by receiver 108 of the primary split beam transducer system 109 which internally calculates angle of detection in two dimensions and a mock range. The information from the split beam receiver is used by the rotator controller 116 to instruct stepper motor 120 which centers the transducer system on the transmitter 104. The angular location information from the primary system is transmitted via computer 124 to a secondary split-beam transducer system 111 that is positioned a known distance a away from the primary transducer. The secondary split-beam transducer then scans along the primary bearing until it locates and centers on the transmitted signal. A representation of the locating process of the secondary system is diagramed in FIG. 2. Both transducer systems are able to maintain lock on the target.

A predictive fish locating algorithm can be added to the rotator control program. One simple example of such an algorithm that predicts incremental movement in each direction is, e.g., for $\Delta x$:

$$\Delta x = [(x_i - x_{i-1}) + 0.5(x_{i-1} - i - 2) + 0.25(x_{i-2} - x_{i-3}) + 0.125(x_{i-3} - x_{i-4})]/1.875$$

Figure 3:
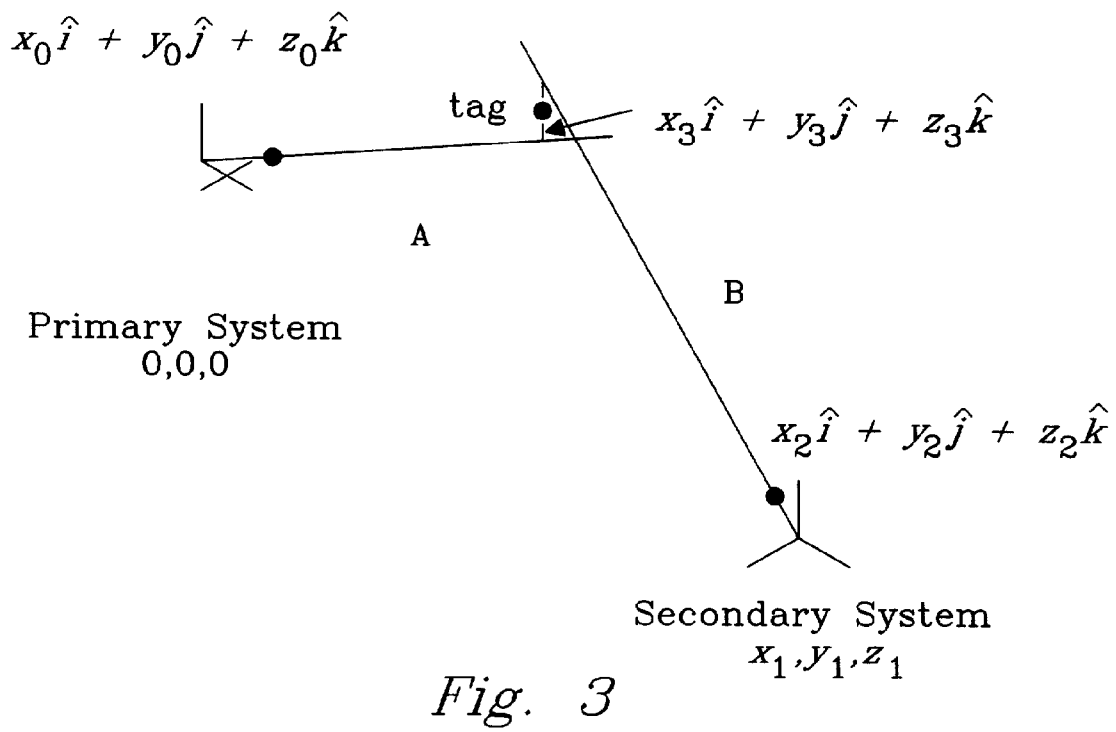
FIG. 3 is a schematic diagram illustrating a solution of the transmitter position along orthogonal vector $x_3\hat{i}+y_3\hat{j}+z_3\hat{k}$.

The two systems simultaneously point unit vectors at the acoustic transmitter from different locations (FIG. 3). These vectors can be assumed to contain some small error in their ability to accurately intersect the transmitter, but the transmitter is equidistant between the two. In order to calculate the position of the acoustic transmitter, five unknowns can be solved. The first two unknowns are the distances A and B closest to the estimated transmitter position and along vectors from the primary and secondary acoustic systems. The other three unknowns are the components $x_3$, $y_3$ and $z_3$ of a vector that compensate for error. This vector is the shortest distance between the two vectors pointing to the transmitter from the primary and secondary systems (i.e., the orthogonal vector $x_3\hat{i} + y_0\hat{j} + z_3\hat{k}$ obtained from the cross product of $x_0\hat{i} + y_0\hat{j} + z_0\hat{k}$ and $x_2\hat{i} + y_2\hat{j} + z_2\hat{k}$). The set of five unknowns can be solved from the five equations:

$$x_0 x_3 + y_0 y_3 + z_0 z_3 = 0;$$

$$x_2 x_3 + y_2 y_3 + z_2 z_3 = 0;$$

$$A x_0 = x_1 + B x_2 + x_3;$$

$$A y_0 = y_1 + B y_2 + y_3;$$

$$A z_0 = z_1 + B z_2 + z_3.$$

After solving for A, B, $x_3$, $y_3$, and $z_3$, the transmitter position (x, y, z) can be calculated as:

$$x = A x_0 - 0.5 x_3;$$

$$y = A y_0 - 0.5 y_3; \text{ and}$$

$$z = A z_0 - 0.5 z_3.$$

Figure 4:
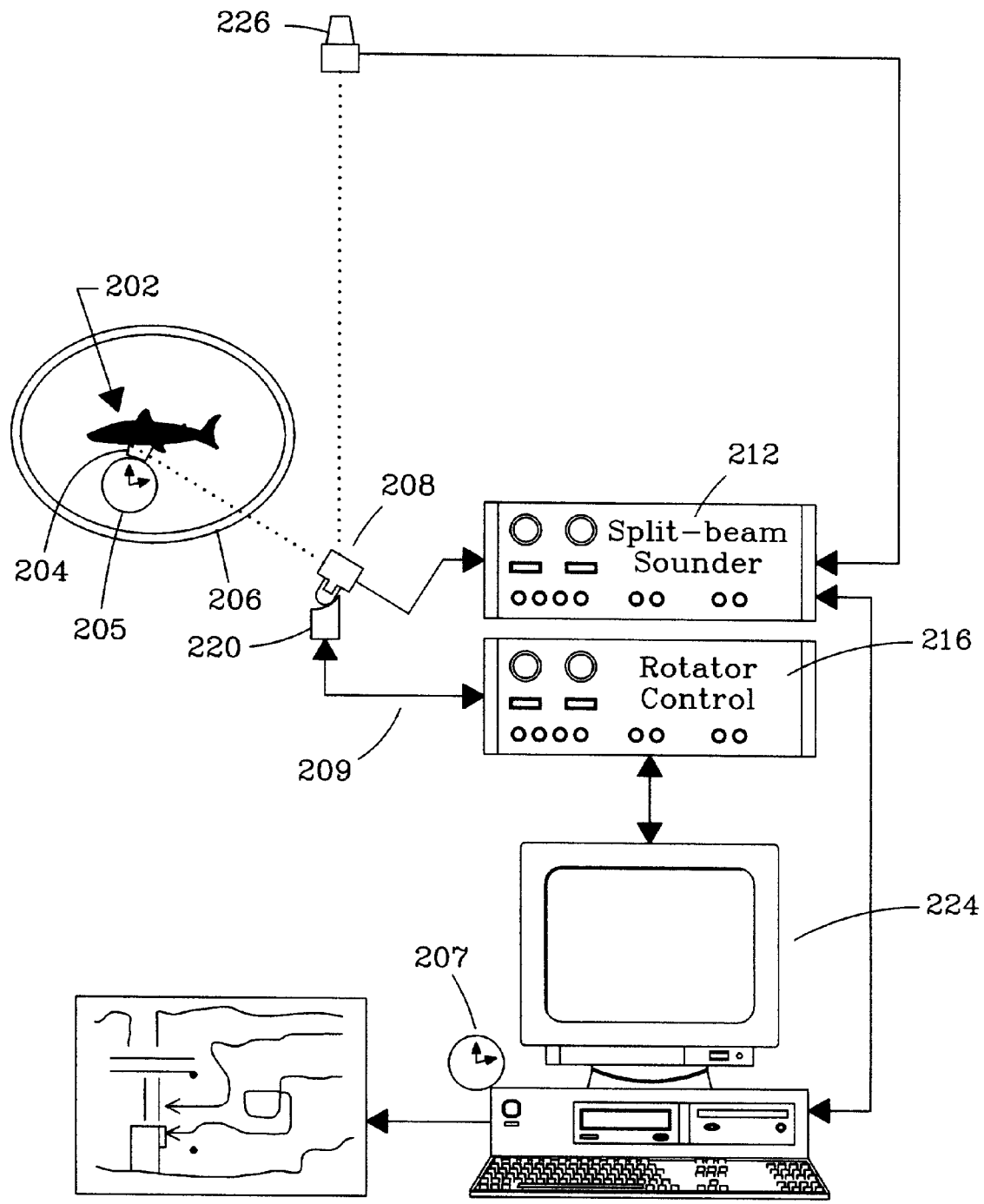
FIG. 4 is a schematic illustration of a single split-beam tracking system in which the distance to the transmitter is measured using synchronized clocks.

A preferred embodiment of apparatus in a second aspect of the invention is illustrated in FIG. 4. An object (typically a fish 202) is tagged with a transmitter 204 that emits a pulse of sound waves 206 at a selected frequency. A timing mechanism 205 attached to the transmitter is precisely synchronized with a second timing mechanism 207 that is incorporated in the split-beam transducer/computer system. The timing mechanism 207 may be a clock such as the computer's internal clock or a time base card. To maximize accuracy, the transmitter and transducer(s) should be synchronized immediately before tracking. The signal is received by receiver 208 of the split beam transducer system 209 which internally calculates angle of detection. The information from the split beam receiver is used by the rotator controller 212 to instruct stepper motor 220 which centers the transducer system on the transmitter 204 to provide an accurate angle of detection. The distance to the object is based on the time which the transducer receives the pulse and is calculated using the speed of sound in the water. Appropriate adjustments may be made by conventional techniques to vary the distance calculations to account for variations in temperature, salinity and sound frequency. The angular location and distance information from the split beam transducer system is transmitted to computer 224 which plots the position of the transmitter.

In a variation of the second aspect, the receiver learns the ping rate of the transmitter by setting the transmitter at a known distance from the receiving transducer and measuring the time from ping to ping over a calibration time sequence. If, after the tagged object is set in motion, the time between received signals lengthens, the object is moving away and if the time shortens the object is moving closer. In this embodiment it is imperative that the transmitter clock be very accurate such that the pings are sent at predictable intervals. The technique also requires a special receiver capable of the synchronization task.

Figure 5:
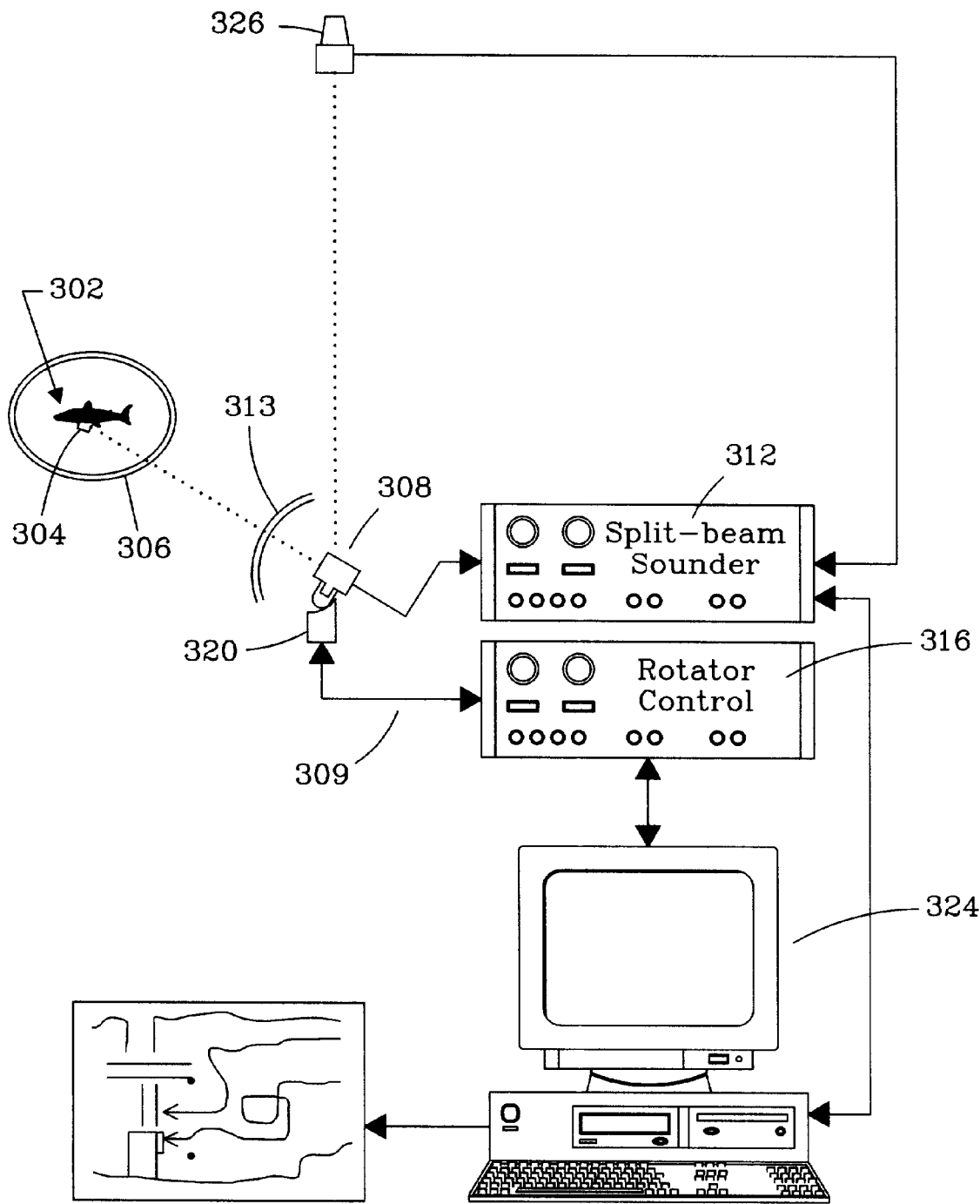
FIG. 5 is a schematic illustration of a single split-beam tracking system in which the distance to the transmitter is measured by echo ranging.

A third aspect of the invention, illustrated in FIG. 5, operates similarly to the second aspect except that distance from the transmitter to the transducer is measured by echo ranging. The transmitter's pulse 306 is detected passively by the transducer system 309 which centers on the transmitter and provides an accurate angle of detection. The transducer system 309 then emits a pulse of sound waves 313 which reflect from the tagged object and are received by the transducer. The distance to the object is then calculated using the speed of sound in the water and may include adjustments appropriate for the particular water conditions. The sound waves emitted by the transducer may be the same frequency as the transmitter, but are preferably at a different frequency (i.e., the tracking system preferably operates in a dual tracking mode). Advantages of the dual tracking mode include reduced signal interference and a more rapid ranging rate, particularly at longer ranges where the time for two way travel may slow the system.

During echo ranging, the transducer system typically looks for a target on-axis or within an acceptable angular range of the axis. The system has the capability to "range track" several targets within a certain angular range of the axis until it has eliminated any "false" targets that may occur initially within the angular range. When all extraneous targets have been eliminated, it sets range limits for continued tracking and only ranges targets within that window.

The second and third aspects have the additional advantage of being capable of tracking the object with only one split-beam transducer. Thus, these methods do not benefit from careful alignment and are therefore less sensitive to being jostled by floating debris than are systems requiring two split-beam transducers. Systems requiring fewer split-beam transducers may also be more economical.

It is important to select appropriate characteristics for the transmitter used in the invention. Tradeoffs exist between ping rate, size, and longevity. For example, a larger transmitter can hold a larger battery and thus have a longer operational life. Ping rates are selected based on detection and coding requirements. To reduce size, but maintain the same detection characteristics for juvenile salmonids, the longevity is reduced. Testing revealed that a juvenile-sized transmitter implanted inside a fish (operating at 200 kHz with a 1 msec pulse width) can be accurately tracked at distances up to about 150 m. The transmitters may also be coded or individualized. For example, particular transmitters may be distinguished by altering the pulse duration and/or interval (e.g., changing pulse rate from 5 to 6 pulses per second).

The transmitters typically emit sound equally in all directions (i.e., they are omnidirectional). Other than the (typically omnidirectional) pulses, the inventive methods do not require the transmitters to transmit any information regarding the direction, depth or location of the transmitter.

Selecting an appropriate frequency is a particularly important aspect of the invention. Previous investigations using transmitter frequencies of 50–60 kHz have been satisfactory for tracking objects in open, deep water, but have been found deficient in tracking objects near hydroelectric projects. It has been discovered that a transmitter frequency of at least about 200 kHz provides excellent tracking response, even in noisy environments such as around a hydroelectric project. On the other hand, high frequencies have relatively higher attenuation rates, and high frequency transmitters can have an unacceptably short range. Thus, the transmitter frequency is preferably between about 200 and about 500 kHz; more preferably between 200 and 450 kHz, inclusive.

The split-beam transducers should have low side lobes and accurate directional response in order to receive acoustic information in relatively noisy environments. Preferably, the acoustic signal from the transmitter is detected using diced array or multi-element transducers. The transducers generally use quadrature sampling. Although split-beam transducers are far more expensive than single beam transducers, they have much better directional accuracy, thus making split-beam transducers ideally suited for use in the inventive methods.

The split-beam transducer may contain elements that are electrically divided into two orthogonal halves. An off-axis acoustic wave front propagating toward the transducer arrives at each half at a different time, causing the phase angle of the electrical output signal from the halves to differ. The fore-and-aft angle can be determined from the electrical phase difference between the fore and aft transducer half, and the athwartship angle from the starboard and port signals. The difference is then calculated and output via a serial port in the form of a telegram to a computer. The telegram contains a detection for one ping; header, time, signal strength, fore-and-aft angle $\gamma$ (degrees), and athwartship angle $\psi$ (degrees). The stepper motor control software receives the fore-and-aft angle, and athwartship angle measurements, then controls the stepper motors to keep the main axis of the transducer beam on the target for tracking purposes. A more detailed description of the split-beam technique can be found in MacLennon and Simmonds, Fisheries Acoustics, Chapman and Hall, New York, N.Y., 1992.

The tracking split-beam system may center an acoustic transmitter on the axis of the main transducer beam, follow its path, and measure its acoustic size. To accomplish this, the split-beam phase angles, $\gamma$ (fore-and-aft) and $\psi$ (athwartship), are compensated by the stepper motor angles $\theta$ and $\phi$. Suitable split-beam transducer systems including appropriate processors for calculating transmitter positions are available from Precision Acoustic Systems, Seattle, Wash.; Hydroacoustic Technology Inc., Seattle, Wash.; Simrad, Seattle, Wash.; and BioSonics, Seattle, Wash.

In a preferred embodiment, the transducer/rotator combination would scan the water column in a systematic fashion from a platform mount located in the forebay upstream of a dam. When a tagged fish was detected, the system would automatically lock onto the target. Because the split-beam system operates in listening mode and the source is omnidirectional, several receiver systems could be deployed in close proximity without concern for interference. Such a pattern would provide redundancy, improved coverage, and triangulation capability.

Typically, the tracking system operates in conjunction with a positioner 126, 226 or 326 that provides precise position information to the split beam transducer systems relative to each other and relative to the location being monitored. Preferred positioners are well known and preferred embodiments include laser range finders and receivers for the Global Positioning System (GPS).

In addition to achieving high accuracy, the use of at least two transducers to track an object eliminates the need to synchronize the transmitter and transducer and avoids echo ranging and the problems associated with echo ranging. In a preferred embodiment a pair of split-beam transducers are positioned on a fixed or mobile platform. For accurate measurements, the split-beam transducers should be mounted on a rigid structure at a fixed distance apart; this configuration will reduce error in the measurement and thus may also simplify the triangulation calculations. An additional advantage of a mobile platform, such as a rigid barge, is that the platform can be relocated and re-aimed to avoid situations where the transmitter approaches the baseline (the baseline is the line that passes through both transducers).

In an example of a mobile platform application, a pair of transducers is mounted on a single motorized platform. The platform starts tracking of a single tagged fish from a known point well upstream. The platform then follows the tagged fish through the forebay, its approach to the structure and, eventually, its passage route. A GPS positioner is particularly advantageous for use with a mobile platform which may move out of range of a fixed-position laser range finder.

The inventive methods have superior accuracy over prior art tracking techniques. The split-beam transducers are typically directionally accurate (i.e., angularly accurate) to within 1%. Preferably, the methods are accurate to within 1% of the distance to the nearest transducer. The methods are also preferably accurate to within $\mp 1$ meter (m), more preferably to within $\mp 0.5$ m. These accuracies can be maintained in noisy environments.

EXAMPLES

All of the tests and examples described hereunder used one or two split-beam transducer and rotator systems. The split-beam transducer systems were obtained from BioSonics Model No. DT6000, Seattle, Wash. The reception characteristics of the main beam of both transducers were 6.2-degree full beam width at half power, with side lobes less than 28 dB relative to the axis. Each split-beam transducer was connected to a two-axis aiming armature operated by high-speed stepper motors obtained from BioSonics, Inc. These stepper motors were computer-controlled by the same computer receiving the transducer's directional signals. Software available from BioSonics had the capability to lock on targets and radar track their trajectories, while continually changing the transducer angle to intercept and center on the target. The tracked data (x,y,z position) was written to a hard drive on the computer. The acoustic signal from the transmitter was detected in the main beam; additional beams of the multi-element transducer detected the direction of the transmitter.

In addition to tracking from the transmitter's sound, positional measurements were obtained using a Fanbeam™ MKIII laser radar system (obtained from Measurement Devices Ltd., Houston, Tex.). The system was comprised of a rotating head mounted on a gearbox and a gallium arsenide laser. The unit was programmed and controlled by a remote PC. Prisms were mounted on objects of interest and reference points and Fanbeam positional data was collected continuously at approximately 1-second intervals. The technical specifications, provided by Measurement Devices Ltd., are listed in Table 1.

TABLE 1

Fanbeam MKIII technical specifications

| Parameter | Limits |
|---|---|
| scan speed | 3° to 50°/sec |
| scan range | up to 360° |
| range resolution | ±10–20 cm (dependent on target and scan rate) |
| angular resolution | better than ±0.02° |
| maximum range | greater than 2000 m (weather dependent) |

The acoustic transmitters were supplied by Sonotronics. All transmitters operated at 200 kHz with a 1 msec pulse width. The transmitters were coded or individualized by altering the pulse interval (pulse rate) by 10 msec; the tested transmitters ranged from 5.0 to 11.1 pulses per second. Two sizes of transmitters were used in this evaluation: juvenile-sized transmitters and adult-sized transmitters (Table 1). Tradeoffs exist between ping rate, size, and longevity. For example, a larger transmitter can hold a larger battery and thus have a longer operational life. Ping rates are determined by detection and coding requirements. To reduce size, but maintain the same detection characteristics for juvenile salmonids, the longevity is reduced. The dimensions and longevity of the prototype transmitters used for this evaluation are shown in Table 2.

TABLE 2

Transmitter dimensions, longevity, and weight

| Type | Length | Diameter | Life | Weight in water | Weight in air |
|---|---|---|---|---|---|
| juvenile | 22 mm | 8 mm | 15 days | 1.5 g | 2.8 g |
| adult | 69 mm | 16 mm | 12 months | 8g | 19.5g |

Test 1—Directional Accuracy

A floating pontoon platform was constructed of two 15.2-cm diameter PVC pipes 1 m long with a 0.6 m×1 m plywood top. An adult-sized transmitter was suspended from the center of the platform, using monofilament line and weighted with a 3.6-kg lead weight. The platform was moved across a pool of water (approximately 106 m×38 m×5.5 m deep, with a capacity of about 2.3×10$^7$ liters) with rope and pulleys fastened to hand railings. The split-beam tracking system was mounted on a 6-m by 7.6-cm diameter aluminum pipe that was fastened to a railing at the center of the back wall of the pool. The transducer was positioned at a depth of 3 m below the surface. The split-beam system and the Fanbeam™ were operated from inside a van located at the south end of the pool.

The Fanbeam™ system used prisms on each target of interest to reflect laser light back to the source. One prism was positioned directly above the transmitter on the platform. Two additional prisms were mounted at each side of the hand railing to serve as reference points. The Fanbeam™ tracked and recorded positions of the prisms approximately every second.

A series of tests were run at various depths with the transmitter stationary or moving at constant rates. Over one hundred split-beam transducer measurements were made for each run.

Two tests (A and D) were run while the top 0.5 m of the pool was being filled. The filling process drove bubbles into the water column and was designed to simulate the noisy environment often found in the vicinity of hydropower projects.

Representative results from this testing are shown in Table 3 below:

| Run | Tag Depth | Tag Speed | Mode | Ave Difference (angular range) | Comment |
|---|---|---|---|---|---|
| A | 3 m | stationary | passive | 0.93° (0.86°–1.03°) | bubbles |
| B | 3 m | 0.32 m/s | passive | 1.12° (0.91°–1.75°) | |
| C | 1 m | 0.22 m/s | passive | 1.59° (0.63°–3.02°) | |
| D | 3 m | 0.54 m/s | passive | 1.80° (0.82°–3.05°) | bubbles |
| E | 3 m | stationary | active-passive | 2.10° (2.04°–2.15°) | |

In general, the average angular difference between the position of the transmitter as measured by the split-beam transducer system and the Fanbeam increased with transmitter speed. When the transmitter was held stationary, the difference in angles was less than 1°, even in a noisy environment (Run A). When the transmitter was moved relatively slowly (for instance, 0.22 and 0.32 m/s), the average difference in angles between the two systems increased to 1.590 and 1.120 (Runs C and B, respectively). With the transmitter moving at a speed more than 0.5 m/s, the difference in angles increased to 1.80 (Run D). The difference in these angles may not be due to acoustic noise introduced by the air bubbles, but rather to the delay in the split-beam transducer system tracking the transmitter.

Figure 6:
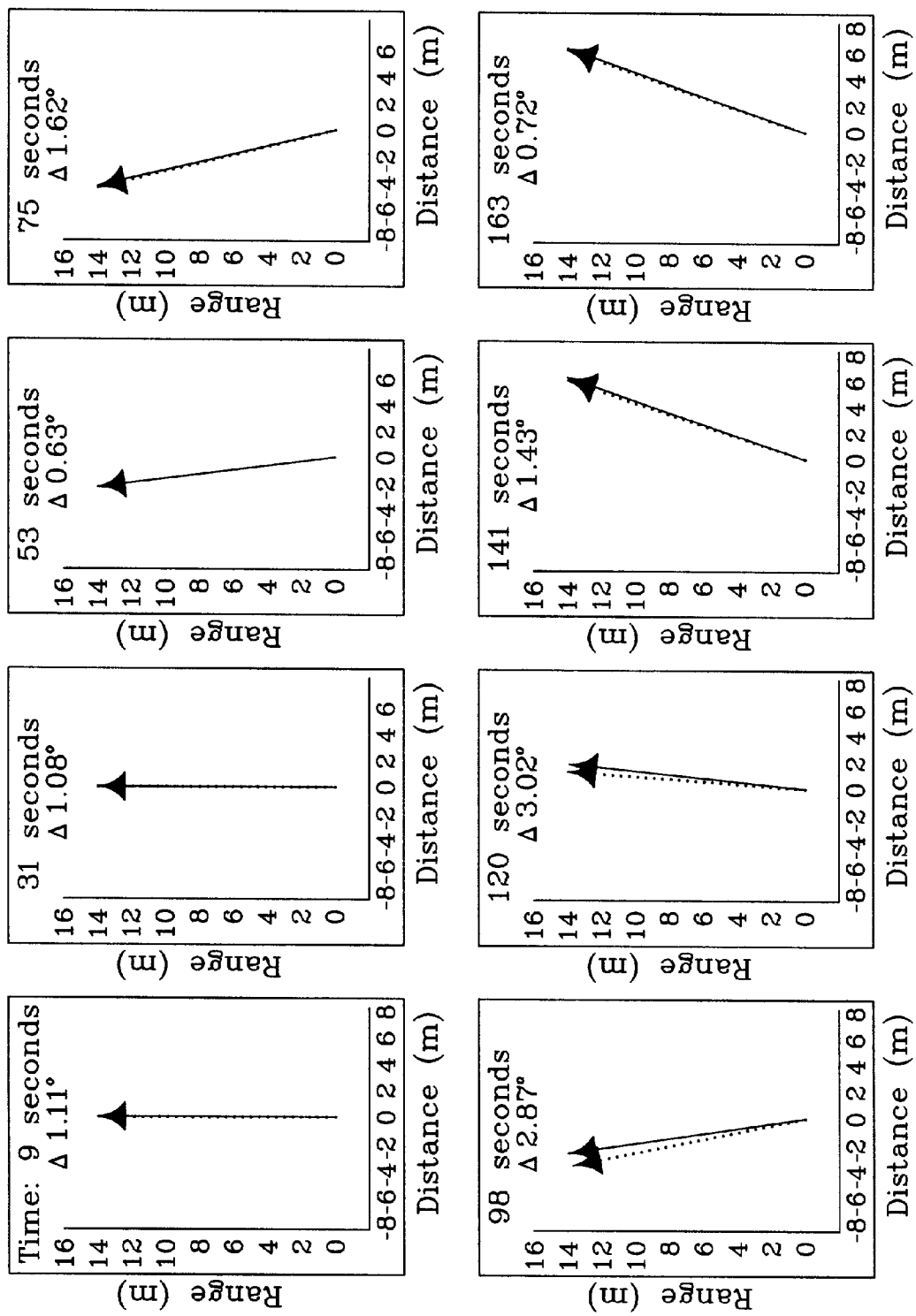
FIG. 6 is a comparison of positional measurements obtained by two split-beam transducers (...) versus a laser-based measurement (-).

An example plot of the data collected from the split-beam transducer and Fanbeam systems for Run D is shown in FIG. 6. The graph represents a series of snapshots over time of the tracked angle for both systems. The testing in the pool showed that the direction of a transmitter could be tracked with a single tracking split-beam system, and this can be done with reasonable accuracy and precision.

Example 1

The Lower Granite Dam on the Snake River was the site for a full-scale field test of the transmitter and tracking system. All testing at this study site occurred in the forebay of Lower Granite Dam. The tests were conducted to simulate the movement of juvenile salmon and determine the accuracy of the tracking system in the intermediate to near-field zones of the Surface Bypass Collector (SBC). The SBC is a steel structure attached to the front of a dam to provide an avenue of passage or collection for downstream smolts as opposed to going through the turbines of the powerhouse. They are under experimental evaluation at Lower Granite Dam and at Bonneville Dam. The idea here is to stimulate the efficient smolt passage typified by the hydro-combine design at Wells Dam on the Columbia River.

Two research barges were fastened together (stern-to-stern), providing the necessary separation of the paired acoustic tracking systems and permitting triangulation. The barges were stabilized by anchor points on both sides and on a tag line from the upstream barge to a trash-shear boom. This configuration formed the platform for the tracking system. One transducer system was deployed at each end of the platform. A small boat was rigged with pulleys between the trash-shear boom and the SBC to form a transmitter trolley. The Fanbeam was located at a measured position on the SBC and scanned an area for complete coverage of the pram and barges from the trash-shear boom to the SBC in a clockwise direction and back. The barges were located approximately 50 m from the SBC.

The two split-beam transducers were separated by 12 m and the receivers were 2 m below the water surface. Each transducer was mounted on a high-speed, dual-axis, motorized armature that was attached to 7.6-cm-diameter aluminum pipe. The pipes were attached to each end of the barge through a gimbal mount. The armature was computer-controlled and automatically followed the transmitter, using angle estimates provided by the transducer. After the primary system acquired the acoustic transmitter, the secondary system scanned along the primary bearing until it located and centered on the transmitter (FIG. 2) and the transmitter position was calculated as described above.

A juvenile-sized transmitter was used for all Lower Granite Dam tests. The 8-mm diameter acoustic transmitter emitted a 1-ms pulse every 100 ms, or 10 times each second. The majority of tests were done with the transmitter placed inside a sacrificed 170-mm rainbow trout from the Battelle hatchery. The fish was suspended from the transom of a 2.4-m pram with 36-kg test monofilament and a 4.5-kg lead weight. The boat traveled between the trash-shear boom and the SBC via a manually operated rope and pulleys. The fish was placed inside a mesh bag that was attached to the line. The fish had been transported live from the Battelle Hatchery Facility and sacrificed immediately prior to the beginning of testing.

Prisms were mounted at five locations: one on the trash-shear boom (for reference), one on the SBC (for reference), one attached to the transom of the boat (the assumed actual transmitter position), and one directly above each of the two tracking split-beam systems.

The first series of tests included those using the boat trolley setup. The transmitter was suspended at various depths from the boat with and without the fish and pulled at differing speeds.

Figure 7:
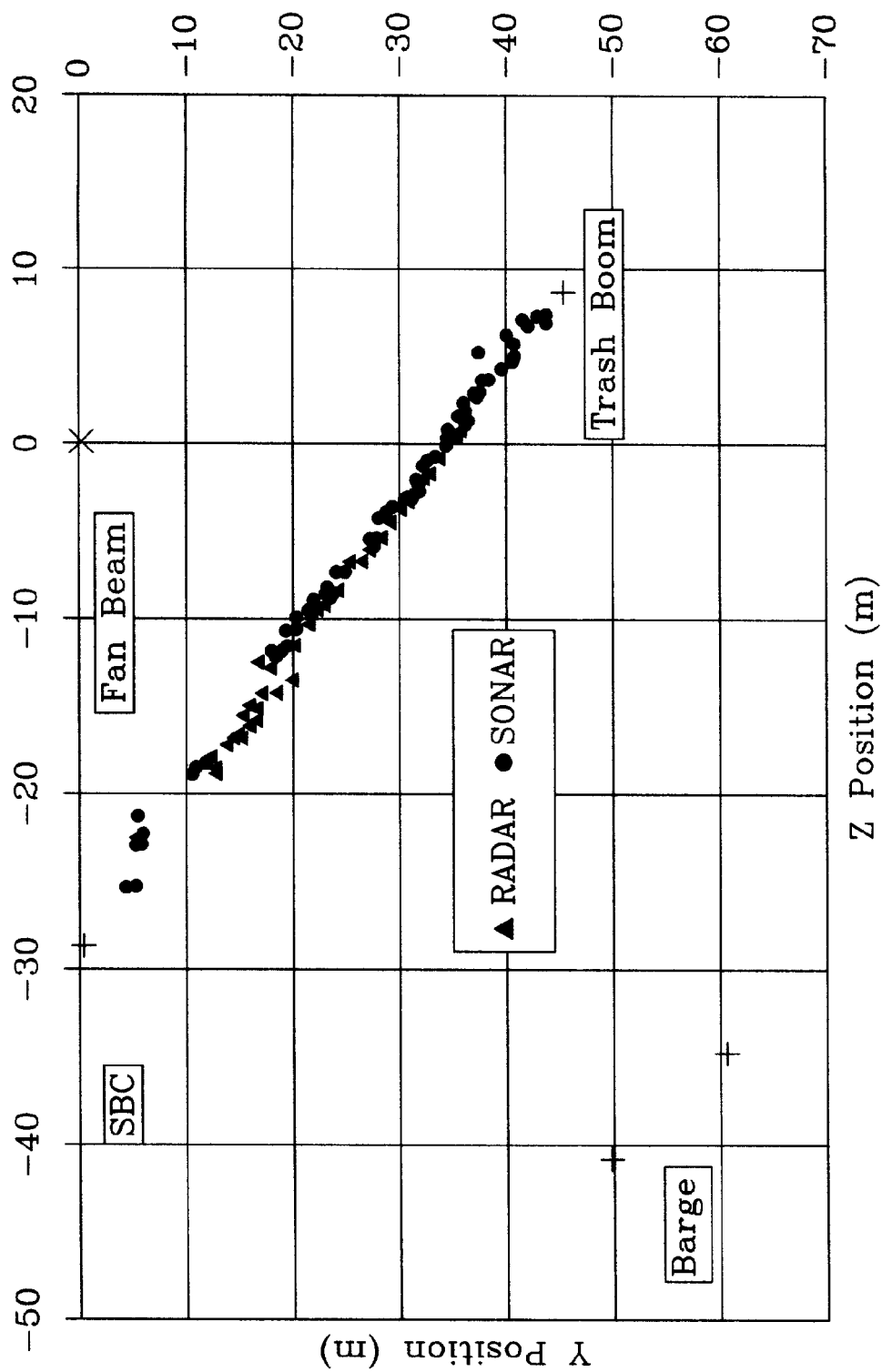
FIG. 7 is a plot of positional measurements obtained by two split-beam transducers (.) and a laser-based method (Δ).
Figure 8:
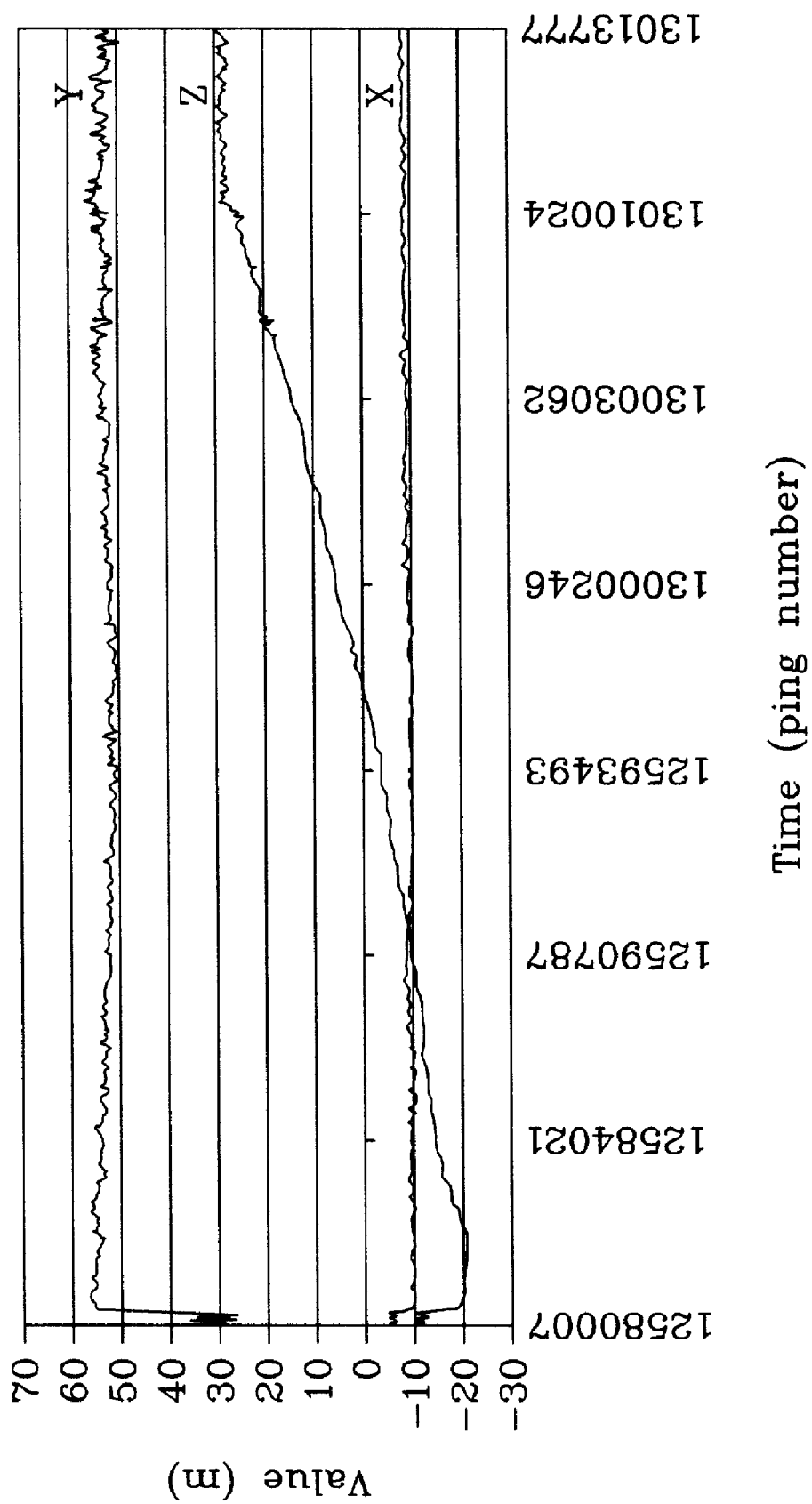
FIG. 8 is plot of x, y and z positional measurements from a run of the two split-beam transducer system at fixed depth (x).

A summary of two representative runs from the trash shear boom towards the SBC is shown in Table 4. A plot of the data collected from the split-beam tracking and Fanbeam™ systems for Run F are shown in FIG. 7. This figure shows a comparison of the z, y coordinates (the coordinates are relative to the position of the Fanbeam™ tracking system) simultaneously collected from the split-beam tracking and Fanbeam systems while FIG. 8 shows the raw split-beam tracking x (depth), y, z coordinate output (relative to a midpoint between the transducers).

TABLE 4

Lower Granite Dam test results summary

| Run | Fish | Tag Depth | Tag Speed | std dev Z | std dev Y |
|-----|------|-----------|-----------|-----------|-----------|
| F | no | 9 m | 0.03 m/s | 0.7 m | 0.5 m |
| G | yes | 9 m | 0.34 m/s | 0.5 m | 0.6 m |

The standard deviation values shown in columns 5 and 6 of Table 4 are the measure of accuracy referred to in the inventive technique.

A second group of tests was a series of vertical transects along the face of the SBC. The transmitter (inside fish) was lowered by hand from the surface to a depth of 30 m. These tests were designed to evaluate the tracking capability near steel structures and the bottom.

Results from the two sets of tests indicated that the two transducer system tracked the transmitter well at differing depths and speeds. Data collected very near structures (less than 1 m) or to the surface were potentially problematic; variation in position estimates increased, due either to reverberation and reflection of the sound waves, or to multipath interference. The amount of variation depends upon the exact surface and structural conditions. These results were expected given the nature of acoustics. It was also noted that when the transmitter was positioned toward the baseline of the two systems, the tracking ability degraded substantially.

A third series of tests was designed to determine the maximum range that the tracking system could consistently lock onto and track a transmitter. A 5.5-m research boat traveled outside the trash-shear boom to the forebay of the spillway. The transmitter (inside fish) was lowered to 20 m below the surface and locked onto by the tracking system near the trash-shear boom. The boat then traveled away from the barges while maintaining continuous radio contact. When the transmitter was reported lost by the tracking system, a hand-held laser range finder was used to estimate the range from the research boat to the transducer. The position of the boat was verified with immediate distance estimates to the spillway and the navlock wall.

Results from the distance test indicated that a transmitter had a maximum range of 126 m to 146 m.

CLOSURE

While a preferred embodiment and examples of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method for the three dimensional tracking of an object underwater comprising:

providing an acoustic transmitter attached to an object to be tracked wherein the transmitter emits sound waves having a frequency of at least about 200 kilohertz;

providing at least one underwater, split beam transducer;

wherein said at least one underwater, split beam transducer finds a signal from said acoustic transmitter and aims at said signal to provide directional information; and using said directional information from said at least one transducer to calculate the location of the object.

2. The method of claim 1 providing at least two underwater, split-beam transducers that are located a known distance apart;

wherein said at least two underwater, split-beam transducers aim at said signal to provide directional information; and using said directional information from said at least two transducers to calculate the location of the object.

3. The method of claim 2 wherein the position of the object is calculated with an accuracy equal to within about 1% of the distance of the object to the nearest transducer.

4. The method of claim 2 wherein the position of the object is calculated with an accuracy in each direction within 1 m of the average absolute value.

5. The method of claim 2 wherein the transmitter emits sound waves having a frequency of between 200 and 450 kHz, inclusive.

6. The method of claim 5 wherein the transmitter has a weight in air of less than 3 grams and is detectable at a range up to 150 meters.

7. The method of claim 2 wherein the object is a fish.

8. The method of claim 7 wherein the fish is tracked in the vicinity of a hydroelectric project.

9. The method of claim 8 further comprising:

providing a laser range finder that precisely locates the position of said at least two split beam transducers relative to said hydroelectric project.

10. The method of claim 7 wherein said acoustic transmitter is encoded to specifically identify the individual fish.

11. The method of claim 7 wherein said at least two underwater, split beam transducers are mounted on a stationary platform.

12. The method of claim 2 wherein said at least two underwater, split beam transducers comprise a primary transducer system and a secondary transducer system, and wherein the primary transducer system finds the signal from the acoustic transmitter and locates the direction of the transmitter;

then the secondary transducer system searches along the direction of the transmitter until the secondary transducer system locks onto the signal; and wherein both of said primary and secondary transducer systems track the position of said transmitter.

13. The method of claim 11 wherein both of said primary and secondary transducer systems are located on the same rigid, mobile platform.

14. The method of claim 1 wherein said transmitter emits pulses at regular time intervals and at known times and further comprising the step of synchronizing said at least one transducer with said known times;

wherein the time at which said split-beam transducer receives said pulses is used to calculate the distance of said transmitter to said transducer;

wherein said split-beam transducer determines the direction of said transmitter by quadrature sampling; and wherein the distance and directional information from said transducer is used to track the location of the object.

15. The method of claim 14 wherein only one split-beam transducer is used to track the object and the object is a fish.

16. The method of claim 1 wherein, after the at least one transducer aims at the signal, the transducer emits a pulse of sound waves;

the sound waves emitted from the transducer reflect from the object and the reflected waves are detected by the transducer to provide distance information based on the length of time the emitted sound waves return to the transducer; and wherein the distance and directional information from said transducer is used to track the location of the object.

17. The method of claim 16 wherein the object is a fish and the sound waves emitted by the transducer have a different frequency from the sound waves emitted by the transmitter.

18. An apparatus for the three dimensional tracking of an object underwater comprising:

an acoustic transmitter attached to an object to be tracked wherein the transmitter emits sound waves having a frequency of at least about 200 kilohertz;

at least one underwater, split beam transducer;

wherein said at least one underwater, split beam transducer is capable of finding a signal from said acoustic transmitter and aiming at said signal to provide directional information; and a computer capable of using said directional information from said at least one transducer to calculate the location of the object.

19. The apparatus of claim 18 comprising at least two underwater, split-beam transducers and a laser range finder capable of precisely locating the position of said at least two split beam transducers.

20. The apparatus of claim 18 comprising timing mechanisms connected to the transmitter and the at least one transducer; wherein said timing mechanisms are precisely synchronized.

21. The apparatus of claim 18 wherein said at least one transducer has echo ranging capability and said object is a fish.

* * * * *